United States Patent [19]

Gijzen et al.

[11] Patent Number: 4,767,187
[45] Date of Patent: Aug. 30, 1988

[54] DEVICE FOR OPTICALLY SCANNING AN INFORMATION CARRIER

[75] Inventors: Wilhelmus A. H. Gijzen; Petrus J. Blankers; Petrus A. W. H. Van Vroenhoven, all of Eindhoven, Netherlands

[73] Assignee: U.S. Philips Corp., New York, N.Y.

[21] Appl. No.: 17,503

[22] Filed: Feb. 24, 1987

[30] Foreign Application Priority Data

Feb. 21, 1986 [NL] Netherlands ............ 8600437

[51] Int. Cl.⁴ .................................... G02B 7/04
[52] U.S. Cl. .......................... 350/247; 350/255; 369/45
[58] Field of Search ............ 350/247, 255; 369/44, 369/45, 46

[56] References Cited

U.S. PATENT DOCUMENTS

| | | | |
|---|---|---|---|
| 4,467,463 | 8/1984 | Yano | 369/45 |
| 4,473,274 | 9/1984 | Yano et al. | 350/255 |
| 4,566,089 | 1/1986 | Kime | 350/255 |
| 4,571,026 | 2/1986 | Maruta | 350/255 |
| 4,664,476 | 5/1987 | Kasuga | 350/247 |
| 4,669,823 | 6/1987 | Iguma et al. | 350/255 |
| 4,687,296 | 8/1987 | Terayama et al. | 350/255 |

Primary Examiner—John K. Corbin
Assistant Examiner—Loha Ben
Attorney, Agent, or Firm—Brian J. Wieghaus

[57] ABSTRACT

The invention relates to an electro-optical device for optically scanning an information carrier, comprising a stationary frame, a movable optical holder, in which an objective having an optical axis is eccentrically mounted, a first electromagnetic actuator for translating the optical holder along a pivotal axis and a second electromagnetic actuator for pivoting the optical holder about this pivotal axis. Each of the actuators comprises a first actuator element secured to the frame and a second actuator element secured to the holder, the first and the second actuator elements cooperating with each other via air gaps. The optical holder is formed with a bore which extends parallel to the optical axis and in which the second actuator element of the second actutor is secured and in which the first actuator element which cooperate with said second actuator element extends with clearance. The second actuator element of the second actuator also functions as the balancing mass.

11 Claims, 1 Drawing Sheet

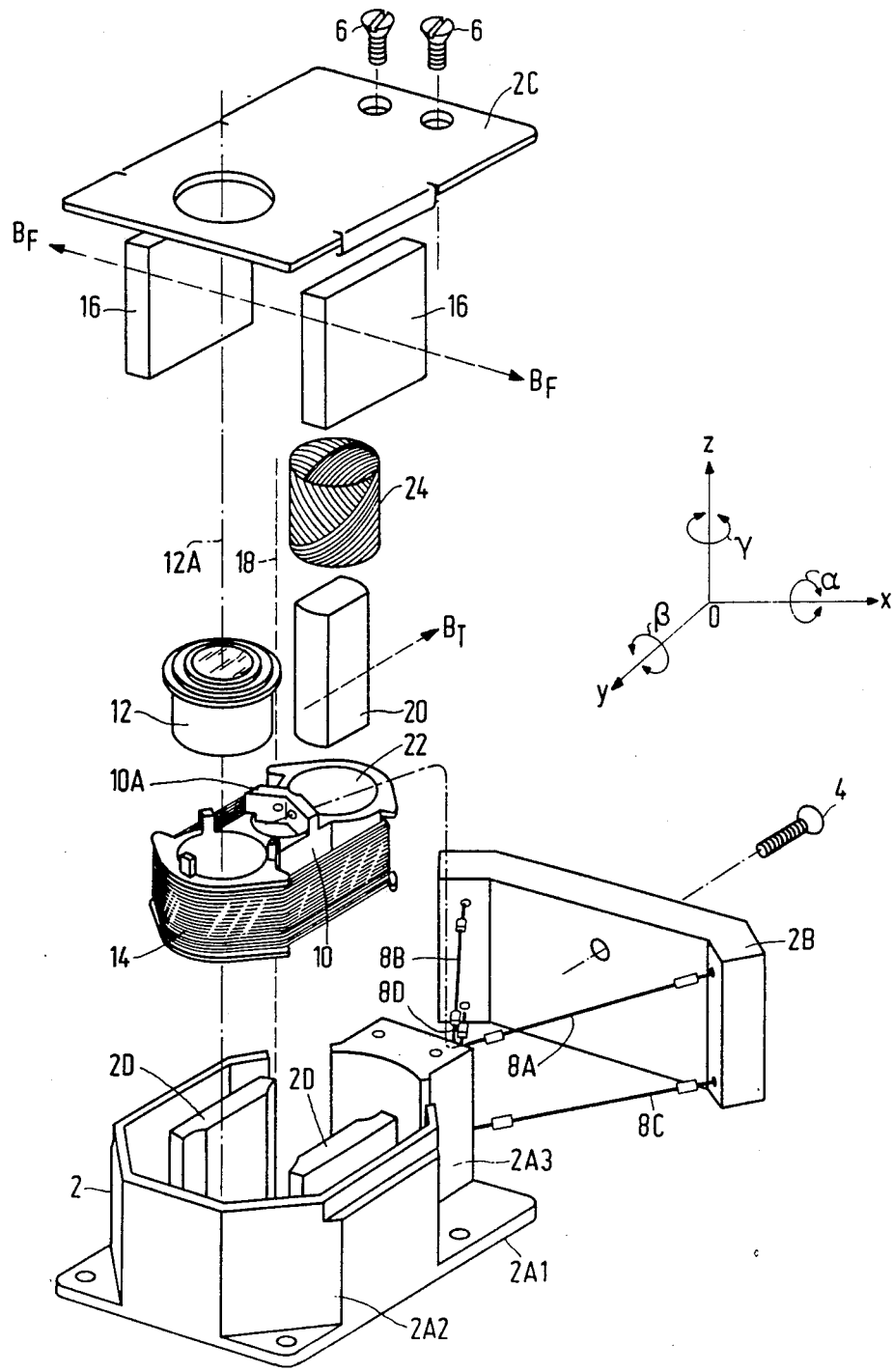

DEVICE FOR OPTICALLY SCANNING AN INFORMATION CARRIER

BACKGROUND OF THE INVENTION

The invention relates to an electro-optical device for optically scanning an information carrier, comprising a stationary frame, a movable optical holder in which an objective having an optical axis is eccentrically mounted, which holder is translatable along and pivotable about a pivotal axis which extends parallel to and is spaced from the optical axis, which holder is further provided with a balancing mass, bearing or supporting means for movably supporting the optical holder, and a first electromagnetic actuator means for translating the optical holder along the pivotal axis and a second electromagnetic actuator means for pivoting the optical holder about the pivotal axis, each of the actuator means comprising a first actuator element secured to the frame and a second actuator element secured to the holder, the first actuator element and the second actuator element being adapted to cooperate with each other via air gaps.

Electro-optical devices of this type are known in many versions, for example from European Patent Application EP-A 0,121,857 (herewith incorporated by reference), to which U.S. Pat. No. 4,566,089 corresponds. The electro-optical device known from said Patent Application is intended for use in an optical-disc player. The electro-optical device enables recording tracks to be recorded in and/or to be read from a recording surface of an optical disc by means of a radiation beam which is produced by a laser source and which is concentrated to form a radiation spot. The holder of the electro-optical device, which is of rectangular construction, is movably suspended relative to the frame with the aid of flexible bearing means in the form of four springs having two bends each. A coil is arranged around the holder to enable the holder to be translated along the optical axis of the objective to maintain the radiation spot constantly in focus on the recording surface of the optical disc. The translational movements of the objective will be referred to hereinafter as focussing movements.

In addition to said focussing movements of the objective radial and tangential movements are necessary for exactly positioning the light spot relative to the tracks on the disc, which movements are generally referred to as radial and tangential tracking movements. In order to produce the radial tracking movements a further coil is arranged on the afore-mentioned coil at each of the four corners of the holder. Said coils all cooperate magnetically with magnets arranged on the stationary frame. When the objective performs a radial tracking movement the holder is rotated about an additional bearing means comprising a spindle which is secured to the frame and a bearing bush which is mounted in the holder so as to be movable relative to said spindle.

A disadvantage of the known electro-optical device is that its construction necessitates the use of an additional element serving as a balancing mass in order to guarantee a reliable operation of the device. Obviously such an additional element results in an increase in weight of the holder and consequently an increasee in the power needed for the focussing and radial tracking movements. Moreover, this necessitates the use of coils which are heavier than is strictly necessary, which leads to a further increase in weight of the entire holder and which may increase in weight of the entire holder and which may also result in an unnecessarily large amount of heat being generated.

European Patent Application EP-A 0,063,934 (herewith incorporated by reference), to which with U.S. Pat. No. 4,467,463 corresponds, describes another construction of the electro-optical device defined in the opening paragraph. This known device employs an objective comprising a plurality of lenses, which objective is mounted in a holder which is pivotable about a spindle journalled in a frame and which is translatable along this spindle. The holder is provided with a magnet which extends in an opening of a coil former provided with coils in such a way that magnetic forces which act parallel to or transversely of said spindle are exerted on the magnet when the coils are driven selectively. Said forces serve to provide the focussing movements and the tracking movements of the objective. A disadvantage of this known device is that the point of action of the magnetic forces intended for the focussing movements is spaced from the axis of rotation, which is liable to give rise to tilting effects between the holder and the spindle during focussing of the objective, which may impair a correct operation of the device.

SUMMARY OF THE INVENTION

It is an object of the invention to provide an electro-optical device of the type defined in the opening paragraph, in which such steps have been taken that the necessary focussing movements and the radial or tangential movements of the objective can be performed in an accurate and reliable manner using a limited power.

To this end the electro-optical device in accordance with the invention is characterized in that the optical holder is formed with a bore which extends parallel to the optical axis, in which bore the second actuator element of the second actuator means is secured and in which the first actuator element of the second actuator means, which is adapted to cooperate with said second actuator element, extends with clearance, and in that the second actuator element of the second actuator means also functions as a balancing mass, the pivotal axis extending between the objective and the relevant second actuator element.

The electro-optical device in accordance with the invention is very suitable for use as a "2D actuator", in which the holder is movable along the pivotal axis for the focussing movements of the objective and in which the holder is pivotable about the pivotal axis for the purpose of radial or tangential tracking.

Since the electro-optical device in accordance with the invention, in particular the holder, cannot only be of symmetrical but also of a very compact and lightweight construction, the power necessary for producing said movements of the objective can be substantially smaller than in the known devices. A low power consumption is of particular importance when the device is employed in portable equipment, such as portable compact-disc players. An additional advantage of a low power consumption is the small amount of heat generated in the coils during use, so that there will be hardly any problems in disposing of the heat.

In the device according to the invention, the two said actuator means are electromagnetically isolated from each other, which yields the important advantage that the dimensions of the air gap in each of the individual actuator means can be optimized, enabling an optimum efficiency of the magnetic circuit to be obtained.

A suitable embodiment of the invention is characterized in that the first actuator element of the second actuator means is a magnet which is secured to the frame and which has a magnetic axis which extends transversely of the optical axis, and in that the second actuator element of the second enables the torques needed for said tracking movements of the objective to be produced by means of only one coil. The known devices require the use of at least two coils for this purpose. from the point of view of production engineering it is favourable to construct said coil as a cylindrical coil.

A very suitable embodiment of the invention in which the bearing means comprise at least four filamentary resilient elements or wires which each have one end secured to the optical holder and the other end to the frame, is characterized in that the filamentary elements, which are substantially straight in the unloaded condition and which are preferably all arranged at the same side of the optical holder, are arranged in pairs which are each disposed in a plane which extends at least substantially transversely of the pivotal axis, the elements of each pair being further disposed so as to diverge relative to each other from the optical holder towards the frame. Said filamentary elements support the holder with the objective to anable it to be moved along the optical axis to provide the necessary focussing movements. It is to be noted that the term "filamentary elements" is to be understood to mean elements which are elongate in relation to their thickness and which may be of circular, rectangular or any cross-sectional shape.

Suitably, this embodiment is characterized further in that the pairs of elements each have a mathematical point of intersection situated on the pivotal axis.

The above arrangement of the filamentary elements results in a system which has the surprising property that the filamentary elements together may be regarded as compliant in specifc desired directions and may be characterized as stiff in other desired directions. The property intended here will be illustrated by means of an orthogonal system of axes XYZ, of which the Z axis is thought to extend along the pivotal axis of the holder. For the purpose of focussing, the holder with the objective must be movable along the Z axis and for the purpose of tracking it must be pivotable to a limited extent about the Z axis. These movements which are required for the holder can be carried out very effectively by means of said system of filamentary elements, because together the filamentary elements are compliant in directions parallel to the Z axis and, moreover, permit pivotal movements about the Z axis. In this respect it is important to maintain a pre-determined orientation of the pivotal axis during operation of the electro-optical device. This is achieved in that the system of filamentary elements has an adequate stiffness in directions parallel to the X axis and the Y axis of said system of axes and in directions about the X-axis and the Y axis. This ensures, for example, that the holder, and in particular the objective, cannot perform any pivotal movements about the X axis and the Y axis, which may result in disturbances and/or displacements of the light spot which is focussed on the optical disc. In particular changes in shapes of the light spot can be very annoying, because they may give rise to coma.

The above property, in combination with the generally low mass of the filamentary elements, renders this embodimnt of the invention also interesting because a compliant, light-weight suspension for the focussing movements of the objective is very important to obtain a large travel of the objective with only a limited power.

Further, it is to be noted that in the case of a symmetrical weight distribution of the holder, this embodiment enables tracking movements of the objective to be obtained which are well defined and insensitive to shocks.

Another suitable embodiment is characterized in that the filamentary elements are electrically conductive. This embodiment is of particular interest if one or more coils used as actuator elements are secured to the movable holder. The filamentary elements may then also be used as electrical conductors.

DESCRIPTION OF THE DRAWING

The invention will now be described in more detail, by way of example, with reference to the drawing, in which the sole FIGURE shows an exploded perspective view of the electro-optical device in accordance with the invention.

DESCRIPTION OF THE PREFERRED EMBODIMENT

The electro-optical device in accordance wtih the invention shown in the FIG. may be employed in an optical-disc player by means of which optical audio discs and/or optical video discs or optical data disc can be inscribed and/or read. Optical-disc players are known per se and will be described only in so far as this is necessary for a correct understanding of the invention.

The device comprises a stationary frame 2, comprising a basic part constituted by a deck plate 2A1 by means of which the frame 2 can be secured in said disc player, an upright wall 2A2 and a mounting element 2A3,and which further comprises a rear wall 2B and a cover plate 2C. The rear wall 2B and the cover plate 2C are secured to the mounting element 2A 3 by means of one bolt 4 and two bolts 6 respectively. A system of four filamentary elements 8A, 8B, 8C and 8D is secured to the rear wall 2B, by means of which an optical holder 10 which is movable relative to the system is suspended.

An objective 12 is mounted in the holder 10, which may be made of a plastic, and comprises one or more lenses and an optical axis 12A. The objective serves for focussing a light beam emitted by a radiation source, for example a semiconductor laser, on the information surface of the rotating optical disc and for maintaining this beam in focus under operating conditions. For this purpose the objective 12 should be capable of performing limited movements along its optical axis, which movements are referred to as focussing movements. In the device in accordance with the invention focussing is effected by moving the holder 10 together with the objective 12 along the optical axis 12A. For this reason the holder 10 is surrounded by a focussing coil 14 which is adapted to cooperate magnetically with two magnets 16 via two upright ferro-magnetic plates 2D secured to the deck plate 2A1 of the frame 2 and via air gaps formed between these plates 2D and the coil 14. The magnets 16 are clamped between the walls 2A2 and the plates 2D of the frame 2 and are magnetized as indicated by the arrows $B_F$ in the drawing. The magnets 16 and the focussing coil 14 constitute the first actuator element and the second actuator element respectively of the first actuator means of the electro-optical device mentioned in the introductory part.

In addition to said focussing movements the objective 12 must be capable of performing movements to maintain the focussed radiation beam in the correct position relative to the information tracks of the rotating optical disc. Generally, these movements are referred to as radial and tangential tracking movements. For the purpose of radial tracking the electro-optical device may be arranged, in a manner knwon per se, on a slide of the optical disc player, the slide performing radial movements viewed from the axis of rotation of the optical disc. Such a construction is decribed, for example, in Netherlands Patent Application No. 8500592 corresponding to U.S. Pat. No. 4,694,442 herewith incorporated by reference. Small tracking corrections can be effected by means of the electro-optical device in accordance with the invention itself, namely by pivoting the holder 10 together with the objective 12 through a limited angle about a pivotal axis 18 which extends parallel tot he optical axis 12A of the objective 12. For this purpose the device is provided with the second actuator means mentioned in the introductory part, whose first actuator element is constituted by a magnet 20 which is glued to the deck plate 2A1 of the frame 2 and whose second actuator element is constituted by a tracking coil 24 which is mounted in a bore 22 in the optical holder 10, which bore is formed, for example, during injection-moulding of the holder 10. The coil 24 is cylindrical and is wound in a manner known from electric motor technology. Said magnet 20, which is magnetized for example in the direction indicated by the arrow $B_T$ in the FIGURE, projects into the interior space of the coil 24 and cooperates with the tracking coil 24 via the air gap formed between the magnet 20 and the coil 24. When the coil 24 is energized it experiences a resultant magnetic force which is oriented transversely of the magnetic direction $B_T$ to pivot the holder 10 about the pivotal axis 18. For the magnetic-flux circuits of the actuator means the frame 2 is at least partly made of, in a suitable manner provided with, a ferromagnetic material.

As is apparent from the Figure the shape of the holder 10 is highly symmetrical, the pivotal axis 18 being situated between the objective 12 and the tracking coil 24. The holder 10 enables the weight of the coil 24 to be selected in such a way that a symmetrical weight distribution in the holder is obtained without thereby impairing the correct operation of the actuator means. Therefore, it is not necessary to balance the holder by means of an additional balancing element.

The said filamentary elements 8A, 8B, 8C and 8D, which in the present example take the form of the lengths of wire of circular cross-section, are each clamped in the rear wall 2B at one of their ends and are pairwise clamped in anupright wall portion 10A of the holder 10 at their other ends. The Figure shows only one wall portion 10A, to which the wires 8A and 8B are secured; the wall portion which is not visible and to which the wires 8C and 8D are secured is situated at a corresponding location near the underside of the holder 10. The wires 8A, 8B and 8C, 8D are arranged in pairs in planes which extend at least substantially transversely of the pivotal axis 18, the pairs of wires 8A, 8B and 8C, 8D intersecting each other and their points of intersection defining the pivotal axis 18. In the present embodiment the respective planes in which the wires 8A, 8B, and 8C, 8D are disposed are inclined at a small angle to one another, the distance between the relevant planes at the location where the ends of the wires 8A, 8B and 8C, 8D are secured to the holder being smaller than at the location of their other ends.

The right-hand part of the Figure shows an orthogonal system of axes XYZ, whose origin O is thought to be situated on the pivotal axis 18 in the holder 10, the Z-axis coinciding with the pivotal axis 18. The system of wires 8A, 8B, 8C and 8D provides axial guidance along the Z-axis for the optical holder 10. As the points where the wires 8A, 8B, 8C and 8D intersect are situated on the Z-axis, the holder 10 is also pivotable about the Z-axis in the indicated directions. It has been found that the system of wires 8A, 8B, 8C and 8D has an adequate stiffness to counteract displacements of the holder in the X and the Y directions of the system of axes and undesired rotations in the directions $\alpha$ and $\beta$ about the X axis and the Y axis respectively.

Suitably, the wires 8A, 8B, 8c and 8D are electrically conductive, so that no additional electrical conductors are needed for supplying the electric currents to and from the coils. For this purpose the wires may be made of a material possessing both the appropriate mechanical and electrical properties, such as steel and phosphor-bronze. Alternatively, the wires may comprise several fibres some of which are electrically conductive.

For completeness' sake it is to be noted that the scope of the invention is not limited to the embodiment described herein. For example, it is possible to replace the cylindrical tracking coil in the present embodiment by a plurality of tracking coils. Within the scope of the invention it is also possible to replace one or more magnets of the frame by one or more suitable coils, which may be affected in combination with the replacement of the coils of the optical holder by magnets.

What is claimed is:

1. A device for optically scanning an information carrier, comprising:
   (a) a frame;
   (b) a movable member movable with respect to said frame having a central axis and two bores extending parallel to said central axis and spaced symmetrically with respect to said central axis;
   (c) means for allowing translation of said member along said central axis and rotation of said member about said central axis, and for preventing translation and rotation of said member in other directions;
   (d) an optical objective having an optical axis for focusing light, onto said information carrier, said objective being secured in one of said bores with said optical axis parallel to said central axis;
   (e) means for translating said movable member along said central axis comprising first and second translation elements which cooperate electromagnetically, said first translation element being secured to said frame and said second translation element being secured to said movable member; and
   (f) means for rotating said movable member about said central axis comprisng first and second rotation elements which cooperate electromagnetically, said first rotation element being secured to said frame and said second rotation element being secured to said optical holder, the mass of said second rotation element being chosen to counterbalance the mass of said optical objective so that said movable member having said optical objective and said second rotation element secured thereon is balanced about said central axis; and said first and second rotation elements being arranged with respect to said first and second translation elements so that said rotating means and said translating means are electromagnetically isolated from each other.

2. A device as claimed in claim 1, wherein said second rotation element comprises a first coil disposed in the other bore not having said optical objective and said first rotation element comprises a magnet having a magnetic axis transverse to said central axis, said magnet extending into said other bore and said first coil.

3. A device as claimed in claim 2, wherein said first coil is cylindrical.

4. A device as claimed in claim 2, wherein said second translation element comprises a second coil disposed around the periphery of said movable member and said first translation element comprises a pair of magnets supported in said frame on respective sides of said movable member and a pair of ferro-magnetic plates arranged between said movable member and a respective magnet.

5. A device as claimed in claim 4, wherein said means for allowing translation and rotation of said member comprises four resilient wires each having a first end connected to said movable member and a second end connected to said frame, said wires being arranged in pairs each in a plane transverse to said central axis and spaced from each other along said central axis, the wires or each pair diverging relative to each other from said member towards said frame.

6. A device as claimed in claim 5, wherein the wires of each pair have a mathematical point of intersection located on said central axis.

7. A device as claimed in claim 6, wherein said wires are electrically conductive for energizing said first and second coils.

8. A device as claimed in claim 1, wherein said second translation element comprises a second coil disposed around the periphery of said movable member and said first translation element comprises a pair of magnets supported in said frame on respective side of said movable member and a pair of ferro-magnetic plates each arranged between said movable member and a respective magnet.

9. In a device for optically scanning an information carrier having a first member and a second member carrying an optical objective having an optical axis, said second member being movable with respect to said first member, the improvement comprising:

means for constraining the movement of said second member to translation along a single axis parallel to said optical axis and rotation of said second member about said single axis said means comprisng four resilient wires each having one end connected to said second member and another end connected to said first member, said wires being arranged in pairs each in a plane transverse to said single axis and spaced from each other along said single axis, the wires of each pair diverging relative to each other from said second member to said first member.

10. A device as claimed in claim 9, wherein the wires of each pair have a mathematical point of intersection located on said single axis.

11. A device as claimed in claim 10, wherein said wires are electrically conductive.

* * * * *

UNITED STATES PATENT AND TRADEMARK OFFICE
CERTIFICATE OF CORRECTION

PATENT NO. : 4,767,187
DATED : August 30, 1988
INVENTOR(S) : GIJZEN ET AL

It is certified that error appears in the above-identified patent and that said Letters Patent is hereby corrected as shown below:

Claim 1, line 14:  Delete comma after "light"

Claim 9, line 9:   Insert comma after -- axis --

Signed and Sealed this

Fourteenth Day of February, 1989

Attest:

DONALD J. QUIGG

Attesting Officer  Commissioner of Patents and Trademarks